(12) United States Patent
Wade et al.

(10) Patent No.: US 9,932,991 B2
(45) Date of Patent: Apr. 3, 2018

(54) ACTIVE SWIRL DEVICE FOR TURBOCHARGER COMPRESSOR

(71) Applicant: Ford Global Technologies, LLC, Dearborn, MI (US)

(72) Inventors: Robert Andrew Wade, Plymouth, MI (US); Tim J. Knott, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 15/090,188

(22) Filed: Apr. 4, 2016

(65) Prior Publication Data

US 2017/0284421 A1    Oct. 5, 2017

(51) Int. Cl.
| | |
|---|---|
| *F02B 33/44* | (2006.01) |
| *F01D 13/00* | (2006.01) |
| *F01D 17/12* | (2006.01) |
| *F04D 1/10* | (2006.01) |
| *F04D 29/66* | (2006.01) |
| *F04D 17/10* | (2006.01) |
| *F04D 29/42* | (2006.01) |
| *F02M 35/12* | (2006.01) |
| *F02M 35/10* | (2006.01) |
| *F04D 29/44* | (2006.01) |

(52) U.S. Cl.
CPC ..... *F04D 29/667* (2013.01); *F02M 35/10157* (2013.01); *F02M 35/1211* (2013.01); *F04D 17/10* (2013.01); *F04D 29/4206* (2013.01); *F04D 29/444* (2013.01); *F05B 2220/40* (2013.01); *F05B 2240/122* (2013.01); *F05B 2260/96* (2013.01)

(58) Field of Classification Search
CPC .... F04D 29/667; F04D 17/10; F04D 29/4206; F04D 29/444; F02M 34/10157; F02M 35/1211; F05B 2220/40; F05B 2240/122; F05B 2260/96
USPC ....... 60/605.1; 415/183, 160, 185, 103, 155, 415/199.6, 203, 143, 151
See application file for complete search history.

(56) References Cited

U.S. PATENT DOCUMENTS 3,922,108 A     11/1975  Benisek
4,375,937 A  *  3/1983   Cooper ............... F04D 29/2277
                                                     415/143

(Continued)

FOREIGN PATENT DOCUMENTS

DE    3817839 A1 * 12/1989 ........... F04D 29/462
GB    1283561 A  *  7/1972 ......... F04D 27/0239

(Continued)

OTHER PUBLICATIONS

Fraser, Neil et al., "Development of a Fully Variable Compressor Map Enhancer for Automotive Application," SAE Technical Paper 2007-01-1558, 2007, doi:10.4271/2007-01-1558, 12 pages.

*Primary Examiner* — Thai Ba Trieu
(74) *Attorney, Agent, or Firm* — Greg Brown; McCoy Russell LLP

(57) ABSTRACT

Methods and systems are provided for mitigating noise generated by a compressor operating at low flow rates. A swirl device with two concentric flow passages upstream of the compressor directs intake air flow to the compressor through two different flow paths, depending on air flow rates. Angled swirl vanes at an outlet of the swirl device pre-whirl the air flowing to the compressor to reduce noise generation at low air flow rates.

19 Claims, 10 Drawing Sheets

(56) References Cited

U.S. PATENT DOCUMENTS

| | | | |
|---|---|---|---|
| 8,079,808 B2 | 12/2011 | Sconfietti | |
| 8,272,832 B2 * | 9/2012 | Yin | F04D 29/444 415/206 |
| 2004/0009061 A1 * | 1/2004 | McDonald | F04D 29/444 415/151 |
| 2004/0096316 A1 | 5/2004 | Simon et al. | |
| 2009/0208331 A1 * | 8/2009 | Haley | F04D 29/4213 415/191 |
| 2014/0230781 A1 | 8/2014 | Newman et al. | |
| 2015/0192133 A1 * | 7/2015 | An | F04D 29/4213 415/203 |
| 2015/0192147 A1 | 7/2015 | An et al. | |
| 2015/0337863 A1 * | 11/2015 | Tomita | F04D 29/4213 415/58.4 |
| 2016/0097351 A1 * | 4/2016 | Kiener | F02B 31/04 123/568.18 |
| 2016/0195109 A1 * | 7/2016 | Richards | F04D 29/266 60/602 |
| 2016/0238013 A1 * | 8/2016 | Weigl | F04D 27/0253 |

FOREIGN PATENT DOCUMENTS

| | | | | |
|---|---|---|---|---|
| JP | 11006500 A | * | 1/1999 | |
| JP | 2014015873 A | * | 1/2014 | |

* cited by examiner

ACTIVE SWIRL DEVICE FOR TURBOCHARGER COMPRESSOR

FIELD

The present description relates generally to methods and systems for turbochargers of internal combustion engines and more particularly to an arrangement for pre-whirling air that enters a compressor.

BACKGROUND/SUMMARY

Turbochargers are widely used on internal combustion engines, and in the past have been particularly used with large diesel engines, especially for highway trucks and marine applications. In distinction to superchargers, which derive their power directly from the crankshaft of the engine, turbochargers are driven by the engine exhaust gases. Exhaust gases are directed to and drive a turbine, and the turbine shaft is connected to and drives the compressor. Ambient air is compressed by the compressor and fed into an intake manifold of the engine to provide the required boost. When a turbocharger is operated over a wide range of engine speed and load conditions, the turbocharger components may function outside the optimum design range and consequently suffer loss of efficiency that adversely affects engine performance and engine attributes like noise.

In the operation of a turbocharger employing a radial compressor, as airflow to the compressor increases, compressor efficiency decreases until air flow chokes with no further increase in flow rate possible. In contrast, as flow rate to the compressor decreases, flow separation occurs which may result in undesirable oscillation and noise generation by the air flowing through the compressor. All compressors have a low flow limit where they enter turbulent full flow reversal and experience surge. Compressor operation during choke and/or surge conditions is aerodynamically and mechanically undesirable for optimal compressor efficiency.

Other attempts to address surge and choke of the supply air to the compressor include the use of pre-whirl apparatus at the periphery of the compressor input opening. One example approach is shown in U.S. Pat. No. 3,922,108, where the pre-whirl apparatus includes a flow duct to the compressor with a rotary pivoted disc valve positioned within the flow duct to control the amount of air passing through the flow duct to a plurality of slanted vanes axially located around the flow duct at the compressor inlet. The slanted swirl vanes impart a swirl to the air directed from the flow duct through the slanted vanes into the compressor.

However, the inventors herein have recognized potential issues with such systems. As one example, the angle of the rotary pivoted disc needs to be varied in the abovementioned apparatus for proportional swirl control, requiring a complex control system. Additionally, the rotary pivoted disc, even when fully open, may itself be an obstruction to the air flow to the compressor can create turbulence and therefore noise. The air path obstruction also is likely to limit the maximum power potential of the engine.

In one example, the issues described above may be addressed by a system for a turbocharger, including a flow channel upstream of a compressor, forming an inner flow passage and an outer flow passage, a plurality of swirl vanes defining a downstream outlet of the outer flow passage, the downstream outlet fluidically connecting the outer flow passage to the compressor, and a recessable plate at an outlet portion of the inner flow passage, the outlet portion fluidically connecting the inner flow passage to the compressor.

In some examples, the system further includes a controller, wherein responsive to an intake air flow rate above a threshold, the controller includes instructions to position the recessable plate to fluidically connect the inner flow passage to the compressor, and responsive to the intake air flow rate below the threshold, the controller includes instructions to position the recessable plate to block fluidic connection of the inner flow passage to the compressor, diverting intake air flow entirely through the outer flow passage. Intake air exits the outer flow passage through the plurality of swirl vanes in a swirled pattern and flows to the compressor at a favorable incidence angle which reducing flow separation and therefore noise generation, increases compressor efficiency and therefore decreases compressor outlet air temperature.

In this way, flowing intake air to a compressor through a swirl device mitigates noise associated with compressor operation at low air flow rates, while preventing air flow obstructions during high air flow rates when the recessable plate is fully stowed. Thus, desired aircharge to the engine for meeting engine torque demands is provided, thereby enabling the compressor to function efficiently along a wide operating range, increasing overall efficiency of the turbocharger and the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The disclosed systems and methods relate to operation of an intake system of an internal combustion engine, specifically, intake systems that utilize a swirl device in an intake passage to regulate flow of intake air through the intake passage to a compressor. Pre-whirling the supply air to the compressor can have beneficial effects in both broadening the efficient operating range of the compressor, increasing its efficiency. Flow of intake air through the swirl device may mitigate noise produced by intake air entering the compressor along a wide operating range of the compressor, optimize air flow to the compressor depending on air flow rate, and deliver adequate intake air through the compressor to the engine for generating desired torque. The swirl device may include two concentric flow passages, wherein the incident angle of air entering the compressor through the swirl device may be controlled by directing flow either through a first flow passage or through a second flow passage, or flow through both passages simultaneously, depending on air flow rate and engine control strategy.

Note that for the purposes of this disclosure the swirl device is in the "closed" position when it is fully activated and a valve plate of the swirl device is fully extended and perpendicular to intake air flow along the first flow passage, resulting in obstruction of air flow from the first flow passage to the compressor, while diverting air flow through the second flow passage of the swirl device to the compressor. Alternatively, the swirl device is in the "open" position when deactivated and the valve plate is fully stowed, minimizing, or eliminating obstruction of air flow through the first flow passage to the compressor.

Figure 1:
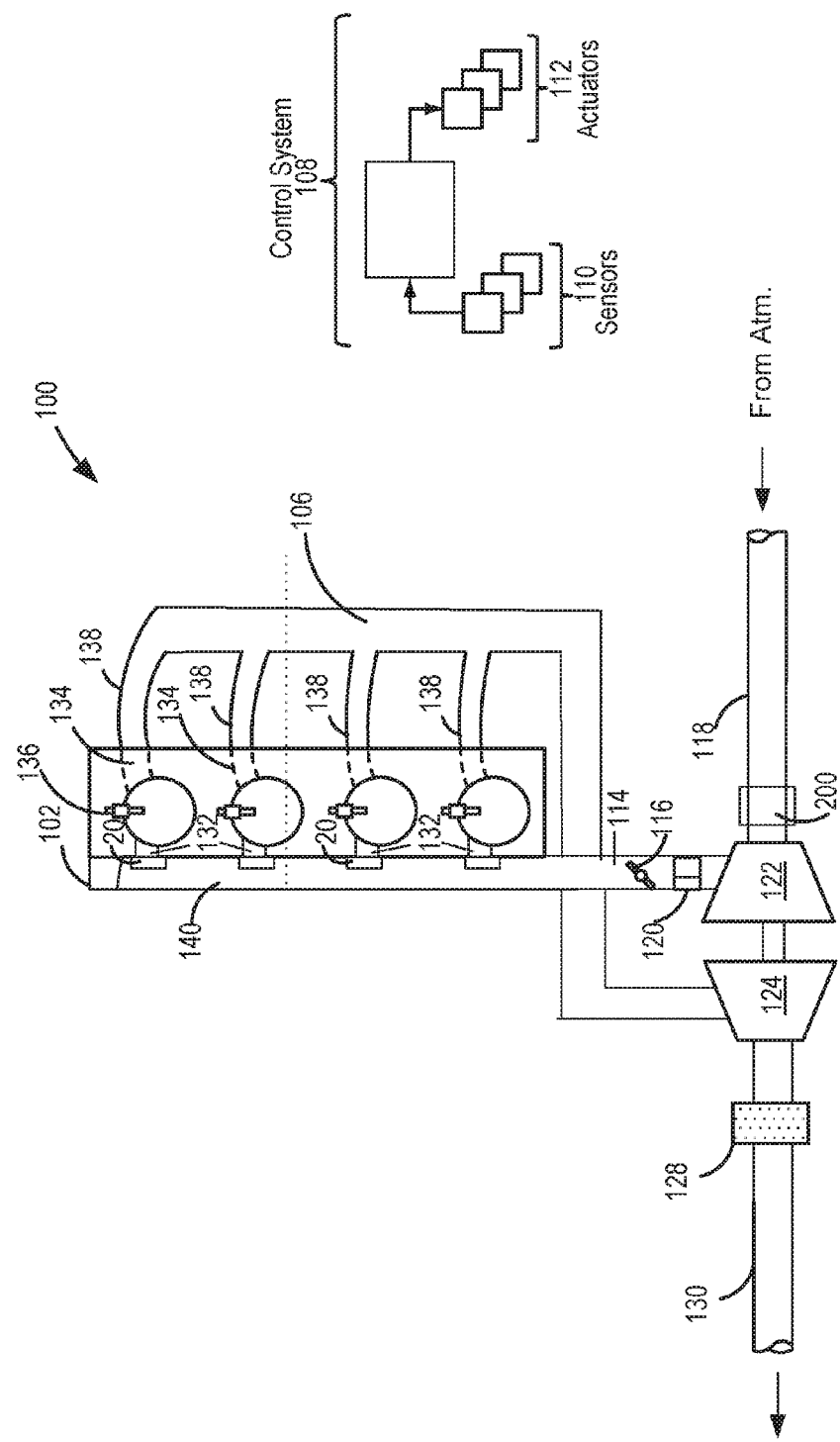
FIG. 1 shows an engine system with an intake and an exhaust manifold and a turbocharger.
Figure 2:
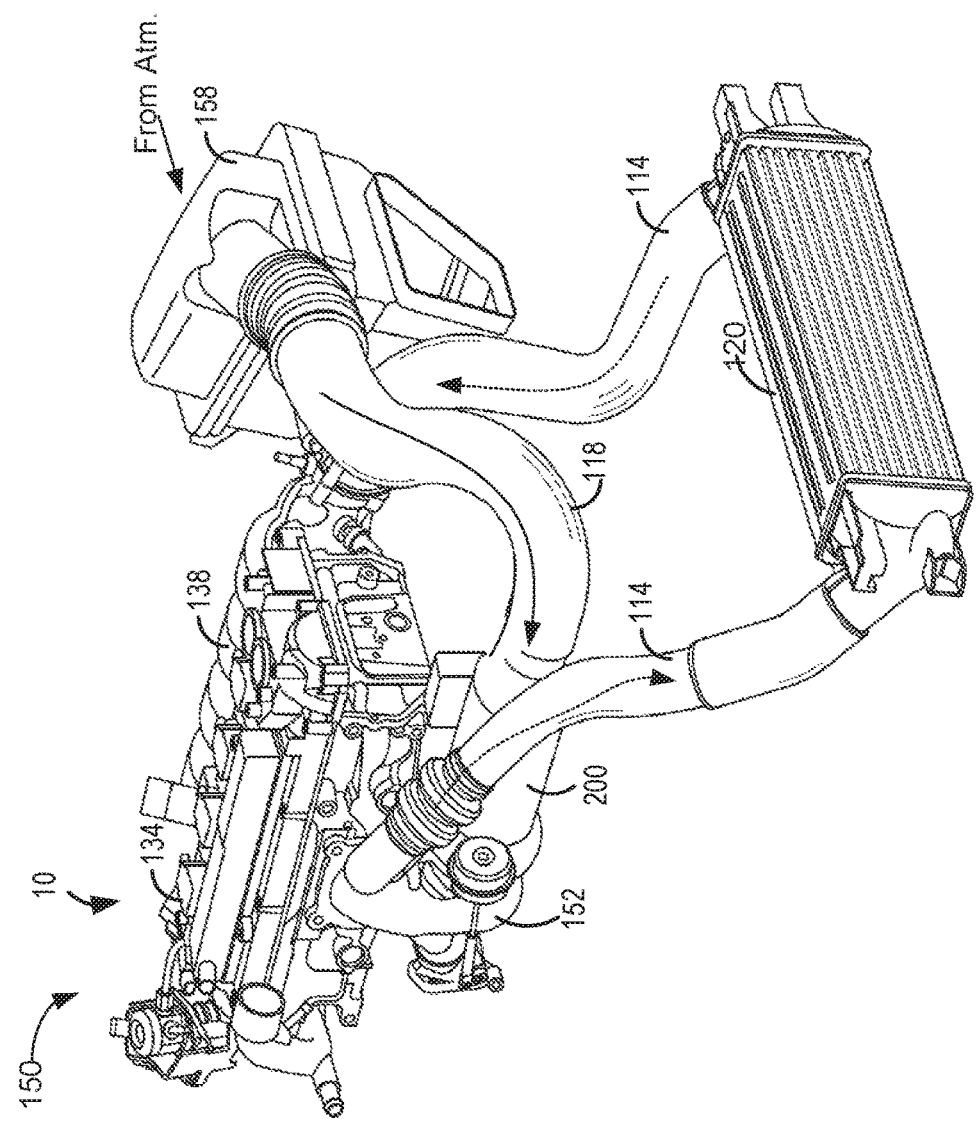
FIG. 2 shows another representation of the engine system of FIG. 1.
Figure 3:
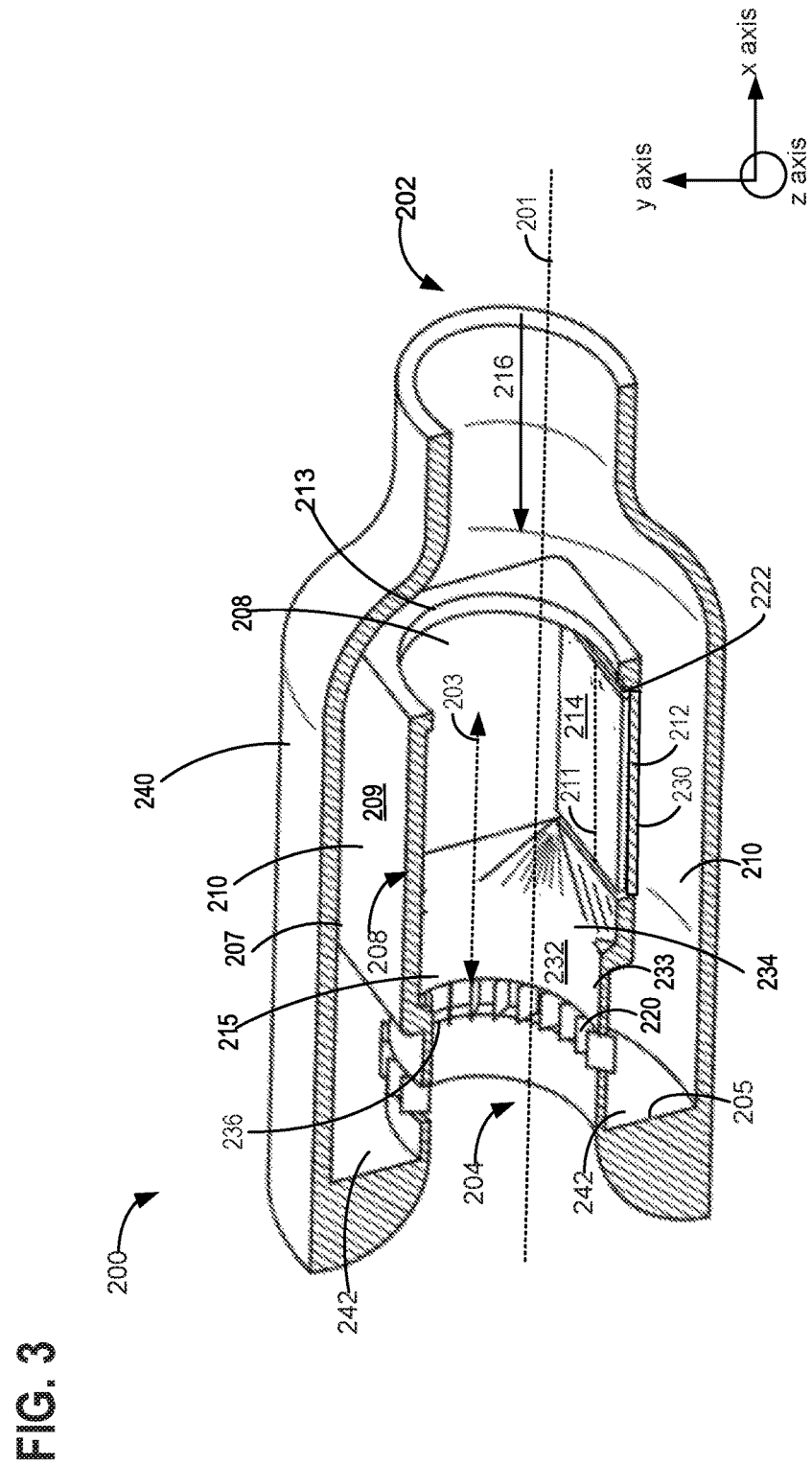
FIG. 3 shows a cross-sectional view of a swirl device for compressor noise optimization.
Figure 4:
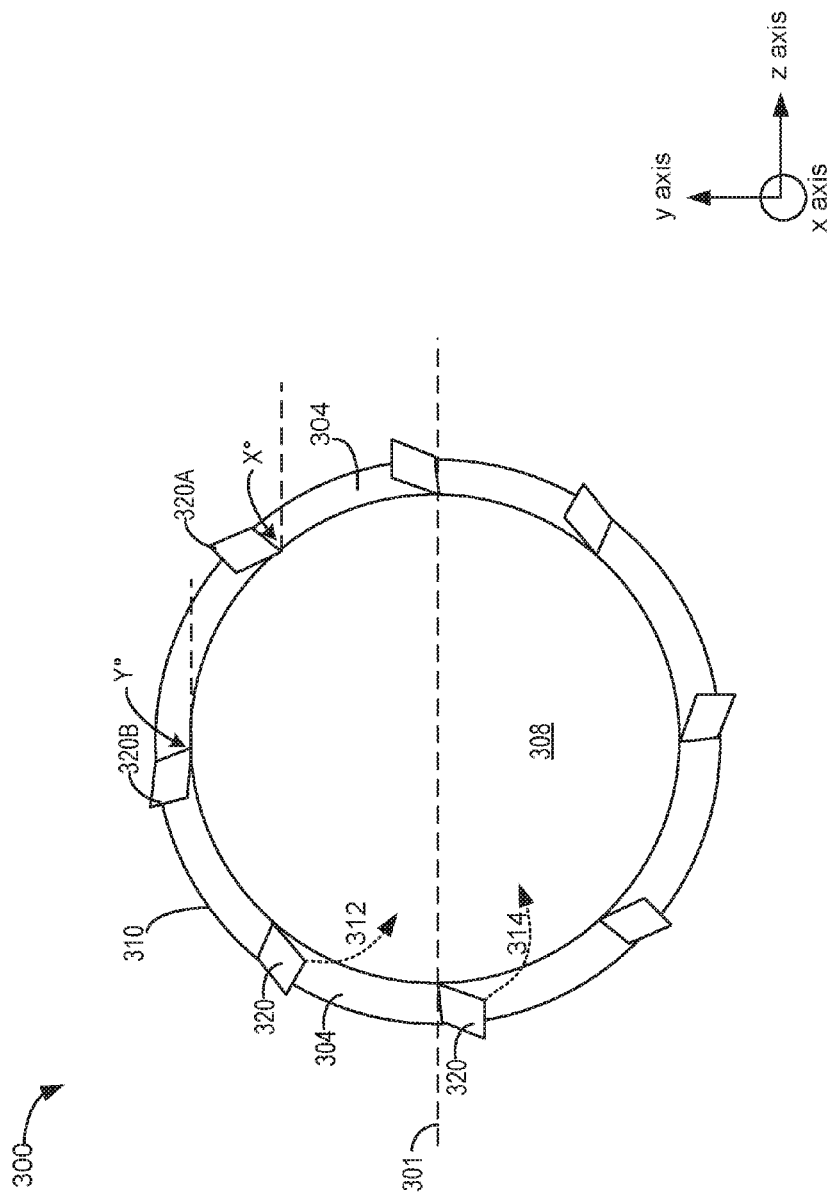
FIG. 4 shows a view of a downstream outlet of the swirl device of FIG. 3 with a plurality of angled swirl vanes.
Figure 5:
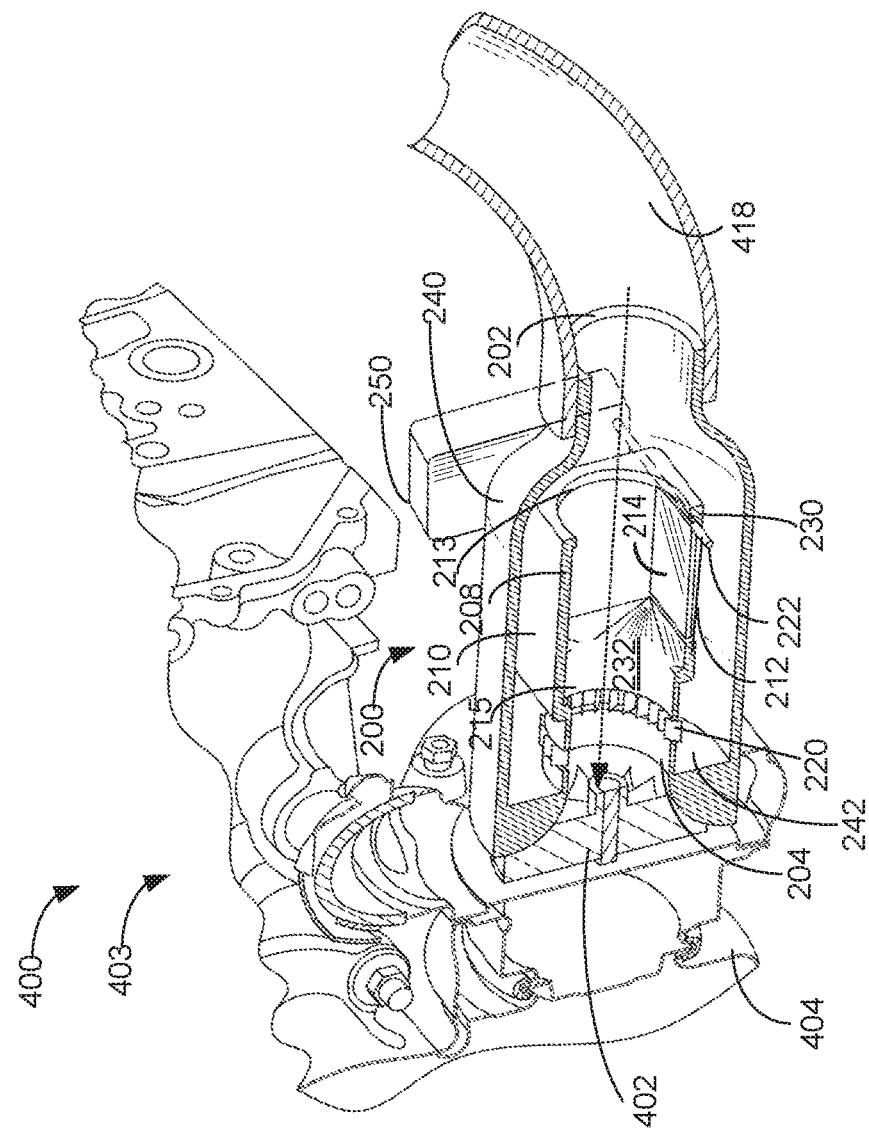
FIG. 5 shows a cross-sectional view of compressor housing with the swirl device of FIG. 3.
Figure 6:
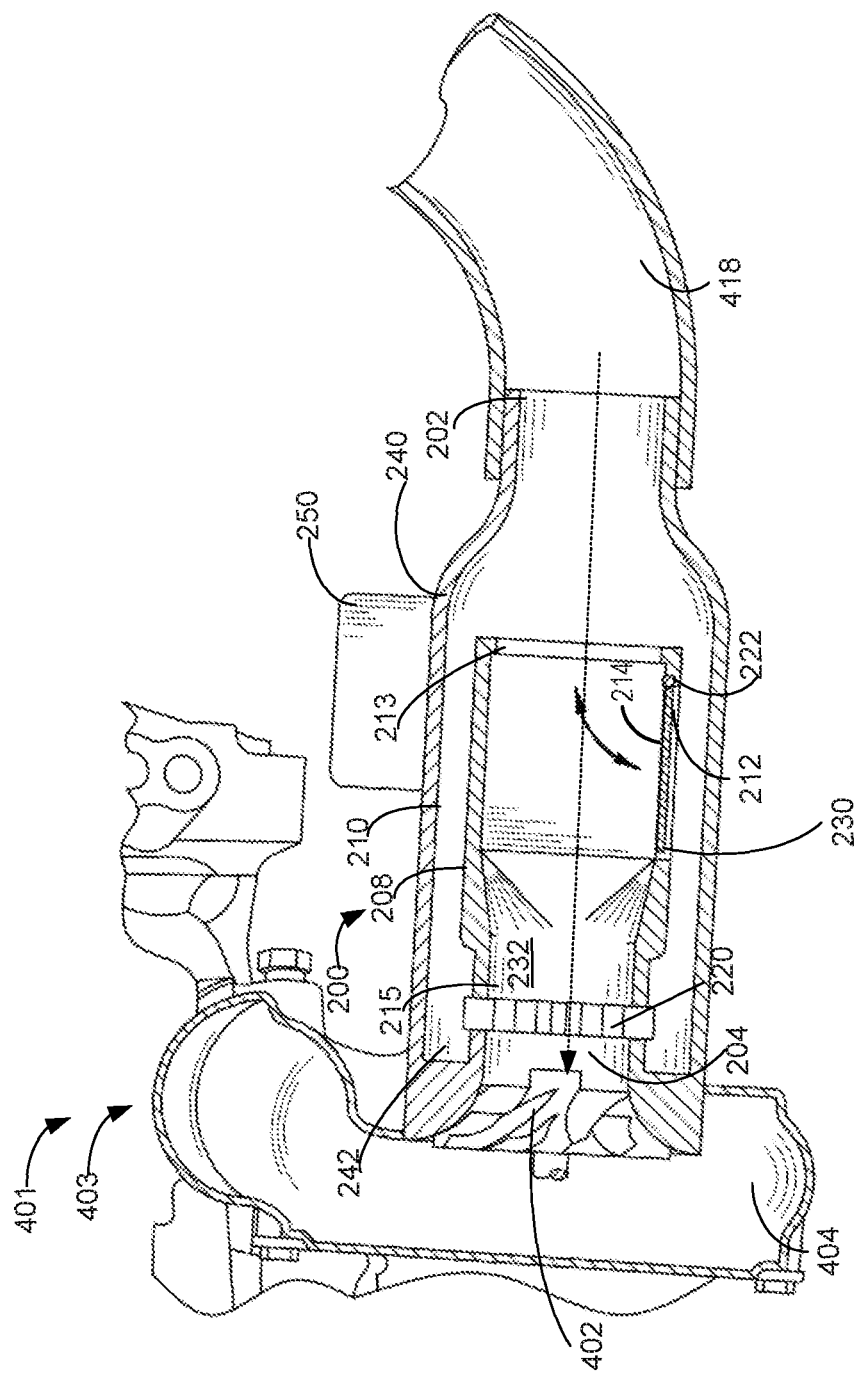
FIG. 6 shows another cross-sectional view of compressor housing with the swirl device of FIG. 3 in a deactivated open position.
Figure 7:
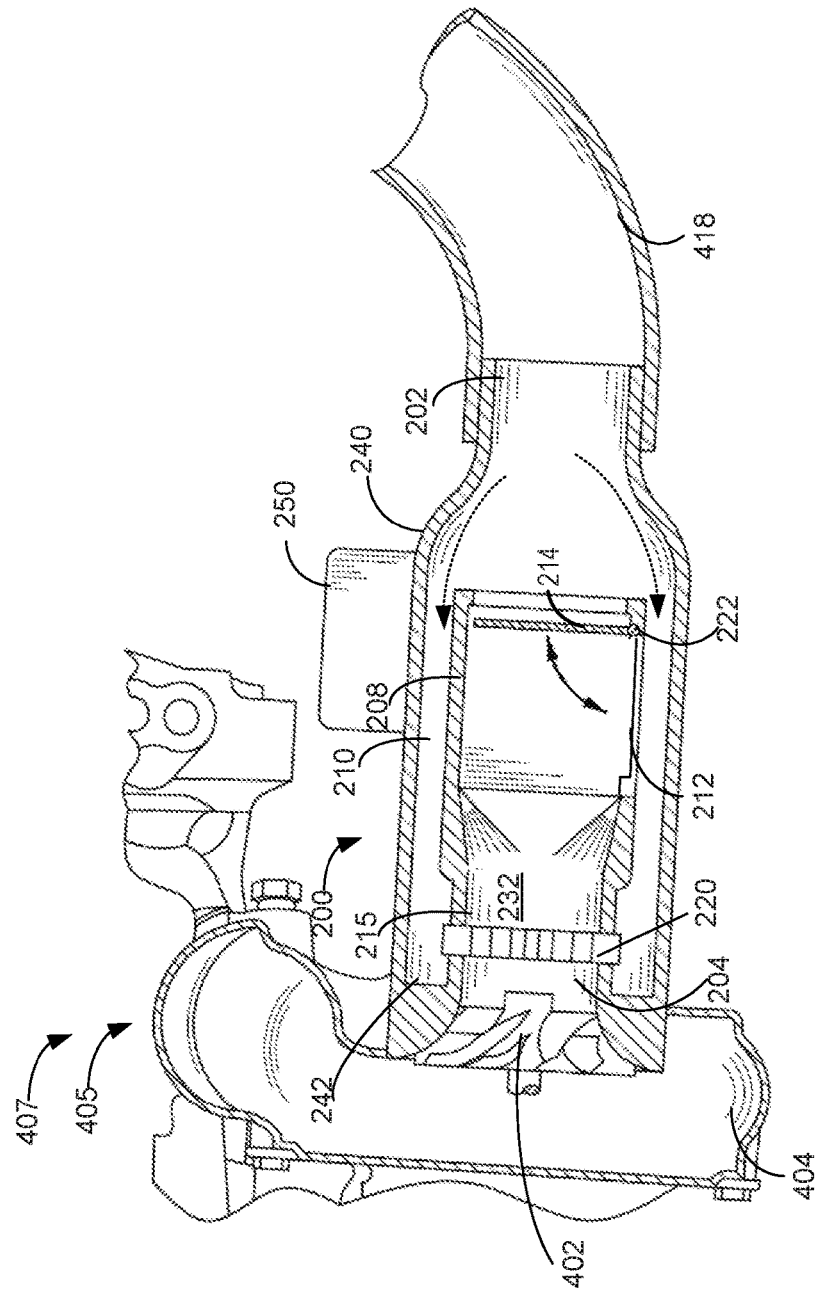
FIG. 7 shows a cross-sectional view of compressor housing with the swirl device of FIG. 3 in an activated closed position.

The schematic representation of FIG. 1 is a simplified intake and exhaust system of an engine that may include an intake manifold that branches upon entering the cylinder head into four individual intake paths disposed on respective combustion chambers. The FIG. 2 shows another representation 150 of the engine system of FIG. 1 for a four-cylinder engine that depicts a compressor housing receiving air through a swirl device and the air from the compressor being directed through a charge air cooler to the intake manifold of the engine. FIG. 3 shows a swirl device with an inner flow passage and an outer flow passage. FIG. 4 illustrates an embodiment of an outlet of the outer flow passage with a plurality of angled swirl vanes, which impart a swirl to the air exiting the outer flow passage and flowing to the compressor. FIGS. 5 and 6 illustrate cross-sections of a compressor system with the swirl device in an open deactivated position, and FIG. 7 illustrates the cross-section of a compressor system with the swirl device in a closed activated position. Intake air flow paths through the inner flow passage and the outer flow passage of the swirl device are illustrated in schematics in FIGS. 8 and 9. A method for regulating air flow through the swirl device to a compressor is illustrated in a flowchart in FIG. 10.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. Yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIGS. 1 and 2 are described collectively. The intake system and exhaust system depicted in FIGS. 1 and 2 are compatible with an engine 100 that may include a plurality of cylinders 134. The example engine has four cylinders 134. In an alternate embodiment, the engine may have two or more cylinders in an inline, boxed, or alternate configuration. Each cylinder 134 may be coupled to a fuel injector 136, to inject fuel directly into the combustion chamber. Alternately, fuel may combine with intake aircharge at a point along the intake path prior to combustion chamber fill.

Cylinders 134 within the cylinder block 102 are coupled to an intake manifold 140 via a cylinder head. The intake manifold 140 may branch into a plurality of discrete paths corresponding to individual cylinders 134 such that each cylinder has one or more intake branch(es) 132 disposed on its inlet. Cylinders having multiple intake branches may employ independent charge motion control valves 20 (CMCVs) or may branch downstream of a singular CMCV. CMCVs 20 may be integrated into each intake manifold port of intake branches 132. Each cylinder 134 may be configured to receive aircharge from the intake branches 132 for combustion. Aircharge may be air from the atmosphere that flows to the compressor 122 and through the compressor to the intake manifold 140. Aircharge may also contain recirculated exhaust gas in engines equipped with EGR (not shown).

As is indicated in FIG. 1, embodiments may include a turbocharger with a compressor 122 upstream of the intake manifold 140 that is driven by a turbine 124. Intake aircharge may be cooled by one or more cooling devices such as cooler 120, downstream of the compressor 122, cooling the intake air entering though the compressor to an intake passage 114.

Intake aircharge may be metered by a throttle 116, downstream of the compressor 122, within the intake passage 114. The throttle is communicatively coupled to a control system 108 and is adjusted responsive to engine operating demands such as engine load requirements and engine temperature. The throttle 116 may be adjusted based on operator-requested torque to deliver a mass of aircharge into the combustion chambers via the intake manifold 140 for combustion. Actuation of CMCVs, 20 may be responsive to throttle actuation and may be used within the control system to monitor engine load. This may be used in combination with sensors measuring atmospheric pressure and/or intake manifold pressure (MAP).

In an example exhaust system, exhausted gas may be expelled from the cylinders 134 into exhaust manifold 106 via exhaust passages 138 after combustion. In embodiments utilizing a turbocharger, the exhaust manifold 106 may be coupled to the turbine 124. Exhaust gas flowing through the exhaust manifold 106 may be treated by one or more exhaust after-treatment devices, such as a catalyst 128, before being discharged into the atmosphere via tailpipe 130. In systems employing low pressure EGR, the exhaust passage downstream of the turbine 124 may be coupled to an intake passage 118 upstream of the compressor 122. In systems employing high pressure EGR, the exhaust manifold upstream of the turbine 124 may be coupled to the intake passage 114 downstream of the compressor 122. One or more exhaust gas cooling systems may be present within the intake or exhaust system.

Intake air through the intake passage 118 may flow to the compressor 122 through a swirl device 200, upstream of the compressor 122. Intake air may flow towards the compressor axially, and an incident angle at which the intake air impinges on a blade of the compressor is determined by a flow rate of the intake air entering an inlet of the compressor and by the blade velocity. If the incident angle of the intake air matches the compressor blade angle, sometimes called the camber line, the air flows smoothly through the compressor, increasing compressor efficiency. As the flow rate of the intake air decreases relative to the blade velocity, the incident angle may become significantly less relative to the blade angle, which may reduce compressor efficiency.

Compressor efficiency may be optimal within the peak efficiency island of a compressor map, where a ratio of air pressure and mass air flow rate results in a favorable incident angle. On the left side of the peak efficiency island, where the ratio of the pressure and the mass air flow rate is decreasing, the incident angle may become unfavorable, reducing compressor efficiency. For example, as the intake air flow rate to the compressor is reduced below a threshold, the ratio of the pressure and the mass air flow rate increases, becoming higher than the peak efficiency island and the incident angle of intake air impinging on the compressor becomes unfavorable. Eventually the incident angle is such that flow separation may occur which may destabilize the flow pattern, resulting in turbulence and noise generation, and may trigger surge.

To mitigate the noise produced during compressor operation and to use the compressor map width for optimal compressor efficiency to achieve desired engine torque, air flow may be regulated to flow through the swirl device 200 to the compressor 122, as will be described below with reference to FIGS. 3-10.

In systems employing low pressure EGR (not shown), exhaust gas from upstream or downstream of the turbine 124 may flow to the intake passage 118 upstream of the compressor 122 and upstream of the swirl device 149. Low pressure EGR along with ambient air may flow through the swirl device to the compressor, wherein the EGR flow rate in combination with ambient flow rate may determine the quantity of air flow through the swirl device. Air flow downstream of the swirl device and downstream of the compressor to the engine may be further regulated by the throttle 116 and/or by CMCVs at the intake branch, to supply aircharge to the engine based on engine operating parameters such as engine load, engine speed, etc.

FIG. 2 shows the representation 150 of the engine 10 coupled to a compressor housing 152, housing an impeller of the compressor 122 (illustrated in FIG. 1), which receives ambient intake air through the intake passage 118. The direction of air flow from atmosphere to the compressor housing 152 through the intake passage 114 is marked by a solid line with an arrowhead. The intake passage 118 may include an air filter 158, wherein air from atmosphere may pass through the air filter 158 and flow through the intake passage 114 to the impeller inside the compressor housing 152.

The swirl device 200 may be positioned in the compressor housing 152, upstream of the compressor impeller. In other examples, the swirl device may be positioned upstream of the compressor housing 152, and may be part of the intake passage 118, fluidically connecting to the compressor housing. The swirl device 200 may regulate the flow of air to the compressor depending on air flow rate parameters as will be discussed below with reference to FIGS. 3-10. Air flowing to the compressor through the swirl device 200 may be compressed by the compressor before it flows out of the compressor housing 152 through the downstream intake passage 114, along a flow path indicated by dashed lines with arrowheads.

The control system 108 may have instructions to actuate CMCVs 20, the swirl device 200, and other valves of the engine system (such as EGR valve/s) via actuators 112 responsive to input from sensors 110. Input information may include temperature within the engine or exhaust system, air flow rate to the compressor, air pressure along the intake passage, etc. In some examples, an actuator may regulate the position of the swirl device to deliver air with or without a swirl to the compressor, depending on the ratio of air pressure and air flow rate. In one example, air may exit an outer flow passage of the swirl device in a swirl pattern and enter the compressor at a favorable incident angle, thereby reducing the noise generated by the compressor when air flow rate is below a threshold. In another example, the air may flow through an inner flow passage of the swirl device, resulting in air flow without the swirl entering the compressor.

FIG. 3 illustrates a cross-sectional view of the swirl device 200 discussed above with reference to FIGS. 1 and 2. In one example, the swirl device 200 may be positioned inside a compressor housing upstream of a compressor impeller (for example, in the compressor housing 152 of FIG. 2). In other examples, the swirl device may be at least partly within, or may be a continuation of an intake passage upstream of the compressor, fluidically connecting the intake passage to the compressor.

The swirl device 200 includes two concentric flow passages, including an inner flow passage 208 encircled by an outer flow passage 210 defined by a cylindrical passage 240. In one example, the cylindrical passage 240, including the inner flow passage 208 and the outer flow passage 210, may be a continuation of an intake passage upstream of the compressor. The cylindrical passage 240 housing the inner flow passage 208 may have same or similar volume as the intake passage.

The inner flow passage 208 is housed inside the cylindrical passage 240 such that, there may be no face sharing contact between an outer wall 209 of the inner flow passage 208 and an inner wall 207 of the cylindrical passage 240. In one example, one or more projecting ribs may be present between the outer wall 209 and the inner wall 207 to maintain a specific relative distance between the inner wall and the outer wall. The outer wall 209 may present along a part of the inner wall 207, such that the inner flow passage 208 may be shorter in length than the cylindrical passage 240 housing the inner flow passage 208. As there may be no face sharing contact between the inner wall 207 of the cylindrical passage 240 and the outer wall 209 of the inner flow passage 208, fluid may flow through the outer flow passage 210 defined by the inner wall 207 and the outer wall 209. The outer flow passage 210 may be concentric to the inner flow passage 208 along a length 203 of the inner flow passage, parallel to a center longitudinal axis 201 of the swirl device 200.

In some examples, the outer flow passage 210 may extend beyond the length 203 of the inner flow passage 208 to a closed end 242, as illustrated in FIG. 3. At the closed end 242, the outer wall 209 and the inner wall 207 may come together. In one example, an intermediate contact wall 205 may intercept the outer flow passage 210 by physically connecting to the outer wall 209 at one end, and to the inner wall 207, thereby framing the closed end 242. X, Y, and Z-axes for the swirl device 200 are also depicted, where the X-axis is parallel to the center longitudinal axis 201 and the Y-axis is perpendicular to the center longitudinal axis.

The swirl device 200 includes an inlet 202 and an outlet 204 opposite the inlet 202. The inlet 202 may be upstream from the outlet 204 in an intake air flow direction, such that when the swirl device 200 is positioned upstream of the compressor, the inlet 202 is farther from the compressor and the outlet 204 is closer to the compressor, as is illustrated in FIGS. 5, 6, and 7, and will be discussed below.

The inner flow passage 208 includes an inner passage inlet 213 and an inner passage outlet 215. The inner passage inlet 213 may receive air flow 216 through the inlet 202 of the swirl device. Air entering the inner flow passage 208 may flow out of the inner passage outlet 215, through the outlet 204 of the swirl device towards a compressor (not shown in FIG. 3), for example, the compressor 122 of FIG. 1. Between the inner passage inlet 213 and the inner passage outlet 215, the inner passage includes a planar wall 230, transitioning to a cylindrical wall 232. The cylindrical wall 232 may frame the inner passage outlet 215 of the inner flow passage 208, while the planar wall 230 may be closer to the inner passage inlet 213. A transition zone 234 may be present between the planar wall 230 and the cylindrical wall 232. In one example, the transition zone 234 may be a concave sloping surface, without angular surface/s between the planar wall 230 and the cylindrical wall 232. Air flowing through the inner passage inlet 213 may flow past the concave sloping surface of the transition zone 234 to the inner passage outlet 215.

The transition zone 234 along an inner wall 233 of the inner flow passage 208 may be downstream of a recess 212 along the planar wall 230. In one example, the transition zone 234 may begin immediately downstream of the recess 212. In another example, the planar wall 230 may continue downstream of the recess 212, before the transition zone 234 transitions to the cylindrical wall 232.

A second transition zone, similar to the transition zone 234, may be present upstream of the recess 212. In one example, a cylindrical wall from the inner passage inlet 213 may transition to the planar wall 230 upstream of the recess 212 through the second transition zone (not shown), and the planar wall 230 may transition to the cylindrical wall 232 downstream of the recess 212 through the transition zone 234. The cylindrical wall upstream of the recess may frame the inner passage inlet 213 and the cylindrical wall 232 downstream of the recess may define the inner passage outlet 215. In another example, the planar wall 230 may at least partly, frame the inner passage inlet 213 while the cylindrical wall 232 may frame the inner passage outlet 215. Thus, air entering the inner passage inlet 213 may flow along the inner flow passage 208, including one or more transition zones, transitioning the planar wall 230 upstream and/or downstream of the recess to the cylindrical wall/s. These passages may also be in the shape of a rectangle with rounded edges to accommodate the recessable flap valve 214 in the shape of a rectangle with rounded edges. This configuration may be used to reduce flow friction in the transition regions.

A recessable flap valve 214 may be attached with a hinge 222 to the planar wall 230 of the inner flow passage 208. The hinge 222 attaching the recessable flap valve 214 to the planar wall 230 may be positioned along the planar wall 230, closer to the inner passage inlet 213 and farther from the inner passage outlet 215. The recessable flap valve 214 when in a first deactivated position, as will be described below in reference to FIGS. 5 and 6, may lay flush with the planar wall 230 within the recess 212 of the planar wall 230. The recess 212 of the planar wall may accommodate the recessable flap valve 214 such that the recessable flap valve may not protrude or extend into the inner flow passage 208, thus not acting as a barrier to air flow from the inner passage inlet 213 to the inner passage outlet 215.

When the recessable flap valve is stowed inside the recess 212, a center axis 211 of the recess may be parallel to a longitudinal axis of the recessable flap valve. There may be face-sharing contact between the planar wall 230 and the recessable flap valve 214 when the recessable flap valve is stowed inside the recess 21. In other examples, the stowed flap valve may not be in face sharing contact or may be in partial face sharing contact with the planar wall but may still be completely stowed into the recess, without projecting into the inner flow passage.

The recessable flap valve attached to the planar wall by the hinge 222 may be moved at a tangent to the recess 212 to position the recessable flap valve from a parallel position to a perpendicular position relative to the center axis 211 of the recess 212, depending on the operating conditions, as will be discussed below with reference to FIGS. 5-10. The flap valve may be also positioned at any angle between parallel and perpendicular to direct air flow both through the inner flow passage 203 and through the outer flow passage 210 simultaneously.

The swirl device inlet 202 is fluidically connected to the outer flow passage 210 and to the inner flow passage 208. When the recessable flap valve is stowed inside the recess 212, as illustrated in FIG. 3, the recessable flap valve may not obstruct the air flow 216 from the inlet 202, to the inner passage inlet 213, or to the inner passage outlet 215. When the recessable flap valve is stowed away in the recess, air from the swirl device inlet 202 may flow through the inner flow passage to the compressor, flowing past a plurality swirl vanes 220, which are positioned at the downstream outlet of the outer flow passage. The air flow from the inner passage outlet, past the swirl vanes may be in a direction parallel to the center longitudinal axis 201, towards the compressor. When the recessable flap valve is stowed away, a small proportion of air flow 216 may also flow through the outer flow passage, while most of the air flow 216 flows through the inner flow passage. The small proportion of air flowing through the outer flow passage may be inconsequential in the operation of the compressor.

In contrast, when the recessable flap valve attached to the hinge 222 is positioned perpendicular to the center axis 211 of the recess 212, the recessable flap valve may span across a width of the inner flow passage, acting as a barrier and preventing fluidic communication between the inner passage inlet 213 and the inner passage outlet 215, which may result in all of the air flow 216 to flow through the outer flow passage 210.

Air flow through the outer flow passage 210 may exit through a downstream outlet 236 of the swirl device 200. The downstream outlet 236 may be positioned downstream of the inner passage outlet 215 and upstream of the closed end 242 of the outer flow passage and also, upstream of a compressor inlet (not shown), such that air exiting the outer flow passage 210 through the downstream outlet 236 may flow towards the compressor through the outlet 204 of the swirl device.

The downstream outlet 236 may include a plurality of angled swirl vanes 220 along a circumferential perimeter of the outer flow passage, enabling fluidic communication between the outer flow passage 210 and the compressor inlet. Air exiting the outer flow passage 210 may flow out through a plurality of gaps between adjacent angled swirl vanes 220 to enter the compressor, as will be described in details with reference to FIG. 4 below.

The recessable flap valve position may be regulated through an actuator 250, for example, an electric actuator or a pneumatic actuator, the actuator 250 being controlled by a controller based on operating parameters, as will be discussed below with reference of FIGS. 5-10. In another example, a Bowden cable may connect the recessable flap valve to a remote actuator, which may then be controlled by the controller.

FIG. 4 illustrates a front view in the intake air flow direction of a downstream outlet 300 with a plurality of angled swirl vanes 320 along a circumferential perimeter of an outer flow passage 310 of a swirl device. The outer flow passage may be concentric to an inner flow passage 308, similar to the outer flow passage 210 and the inner flow passage 208 of the swirl device 200. X, Y, and Z-axes for the downstream outlet 300 are also depicted, where the Z-axis is parallel to a center axis 301 of the downstream outlet 300 and the Y-axis is perpendicular to the center axis 301. Air may flow out from the outer flow passage 310 or the inner flow passage 308 along the X-axis, out and away from the figure, as is illustrated in FIG. 4.

The angled swirl vanes 320 are positioned such that air may flow out of the outer flow passage 310 through gaps 304 between adjacent angled swirl vanes 320. In one example, the angled swirl vanes 320 may be present at regular intervals at the downstream outlet 300 of the outer flow passage 310. The angle of each of the angled swirl vanes 320 relative to a respective axis parallel to the center axis 301 may vary along the perimeter of the downstream outlet 300. In one example, an angled swirl vane 320A may be at an angle of X°, while another angled swirl vane 320B may be at an angle of Y°, relative to the center axis 301. In a further example, X° may be less than 90°, while Y° may be more than 90°. Other examples may include different spacing between consecutive angled swirl vanes around the perimeter to manage noise generated from air flow over the angled vanes. In another example, the angle of the swirl vanes may be varied by coupling the angled swirl vanes to an actuator and a control algorithm.

When flow through the inner flow passage 308 is obstructed by a recessable flap valve as described above with reference to FIG. 3, air flow may be diverted to flow through the outer flow passage of the swirl device, and exit through the gaps 304 between the angled swirl vanes 320, supplying air to a compressor. The air flowing out of each of the gaps 304 may have a specific angular trajectory relative to the center axis 301, resulting in generation of a swirl in the air exiting the outer flow passage of the swirl device.

The intake air exiting the outer flow passage may flow out of the downstream outlet, along multiple flow paths, having an upward, downward, and/or sideways trajectory relative to the center axis 301 of the downstream outlet. In one example, a first air stream 312 exiting the outer flow passage 310 through the gap 304 may have a first trajectory, which may be different from a second trajectory of a second air stream 314, as illustrated in FIG. 4. The direction of the swirl generated in the air exiting the outer flow passage may be dependent on the number, angle, and orientation of the swirl vanes relative to the center axis at the downstream outlet. Thus, the air flowing out of the downstream outlet 300 may be the swirled/pre-whirled before the air enters a downstream compressor.

In one example, the outer flow passage may be partitioned into a plurality of outer channels, each outer channel with an inlet and an outlet. Each outer channels inlet may be in fluidic communication with the swirl device inlet 202 and each outer channel outlet may be in fluidic communication with a compressor inlet through gap/s adjacent to at least one angled swirl vane that may be present at the outlet. The air exiting each of the outer channels may include a swirled flow pattern.

FIGS. 5 and 6 illustrate cross-sectional views 400 and 401 of a compressor system with the swirl device 200 inside a passage of a compressor housing 404 in a first deactivated position 403 and FIG. 7 illustrates a cross-sectional view 407 of the swirl device 200 in a second activated position 405. An intake passage 418 bringing intake air fluidically connects to the swirl device 200. FIGS. 5, 6, and 7 will be described collectively. The features of the swirl device 200 are described in relation to FIG. 3. Components previously introduced in FIG. 3 pertaining to the swirl device 200 are numbered similarly and not reintroduced. The swirl device 200 inside the compressor housing 404 may be in fluidic communication with atmosphere, flowing intake air to a compressor impeller 402 inside the compressor housing 404. The air delivered to the compressor impeller 402 may be compressed by the compressor impeller 402 and delivered to an intake manifold of the engine, for example, the intake manifold 140 illustrated in FIG. 1.

Intake air may flow through the intake passage 418, to inlet 202 of the swirl device 200 and then through the inner flow passage 208 to the compressor impeller 402 when the swirl device 200 is in the first deactivated position 403, as illustrated in FIGS. 5 and 6. During the first deactivated position 403, the recessable flap valve 214 is stowed inside the recess 212 in the planar wall 230 of the swirl device, as described above with reference to FIG. 3. Air flows through the inner flow passage 208 to the compressor impeller 402, as illustrated by a dashed line with an arrowhead in FIGS. 5 and 6. The first deactivated position of the swirl device may be present when air flow rate to the compressor impeller 402 is higher than a threshold value.

In contrast, when the swirl device is in the second activated position 405, the recessable flap valve 214 may be perpendicular to the recess 212, blocking air flow from the intake passage 418 through the inner flow passage 208 to the compressor impeller 402, as illustrated in FIG. 7. The second activated position of the swirl device may be present when air flow rate is below the threshold.

When air flow through the inner flow passage 208 is blocked by the recessable flap valve 214, air entering the inlet 202 of the swirl device from the passage 218 may be diverted to flow through the outer flow passage 210, as indicated by dashed lines with arrowheads in FIG. 7. Air flowing through the outer flow passage 210 may exit through the gaps between the angled swirl vanes 220 at the most downstream outlet 236 of the swirl device 200. As described previously with reference to FIG. 4, the air exiting through the gaps between adjacent angled swirl vanes may include a swirl flow pattern. The air exiting the outer flow channel with the swirl pattern may then enter the compressor impeller 402 at a favorable incident angle, reducing the noise generated by air entering the compressor at flow rates below the threshold.

Thus, the position of the flap valve of the swirl device regulates air flow to the compressor depending on air flow rate and mitigates the noise associated with compressor operation at low flow rates by diverting air to flow through the outer flow passage. Angled vanes at the outlet of the outer flow passage impart a swirl to the exiting air, thereby changing the incident angle of air entering the compressor, reducing flow separation, improving compressor efficiency, and reducing noise generation.

Figure 8:
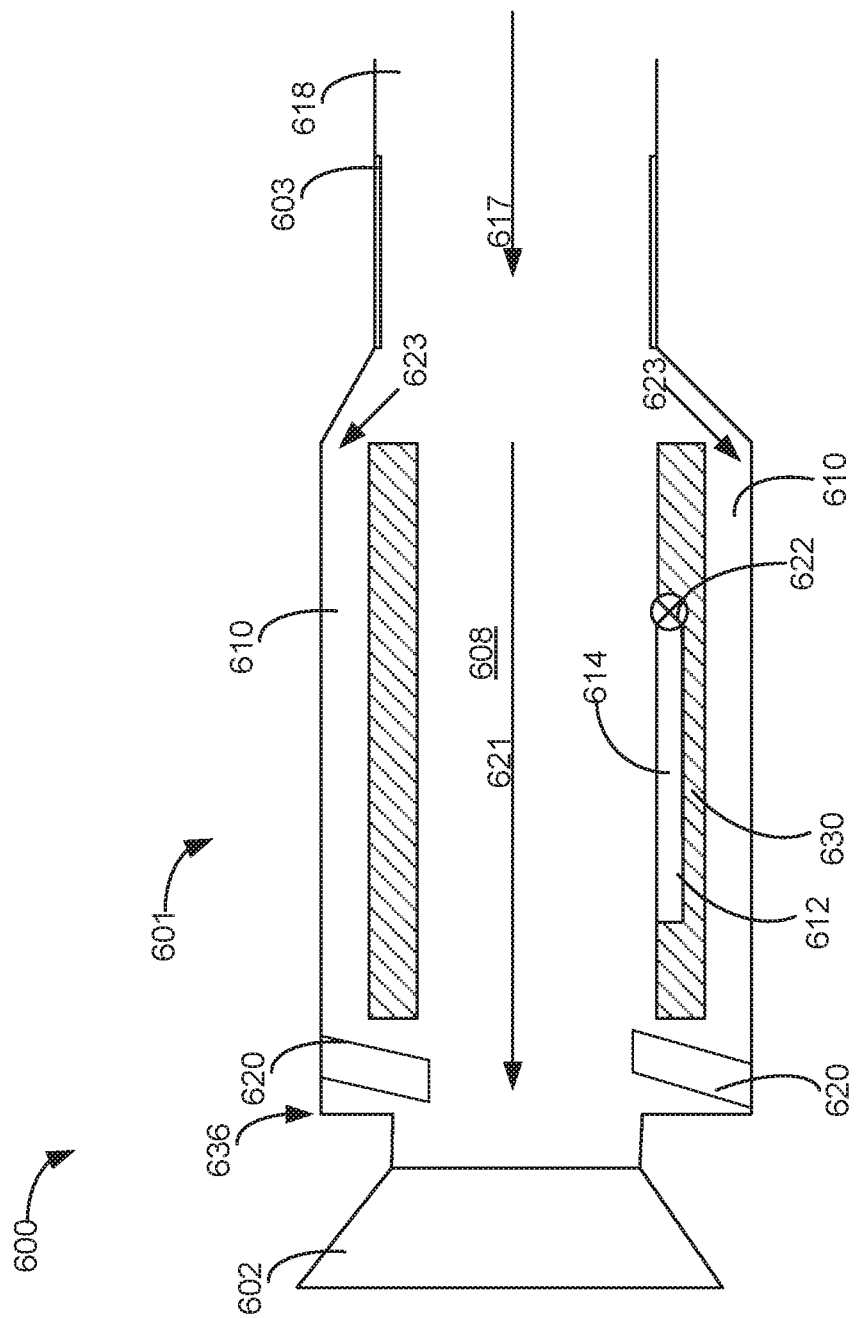
FIG. 8 is a schematic of air flow path through the swirl device in a deactivated open position.
Figure 9:
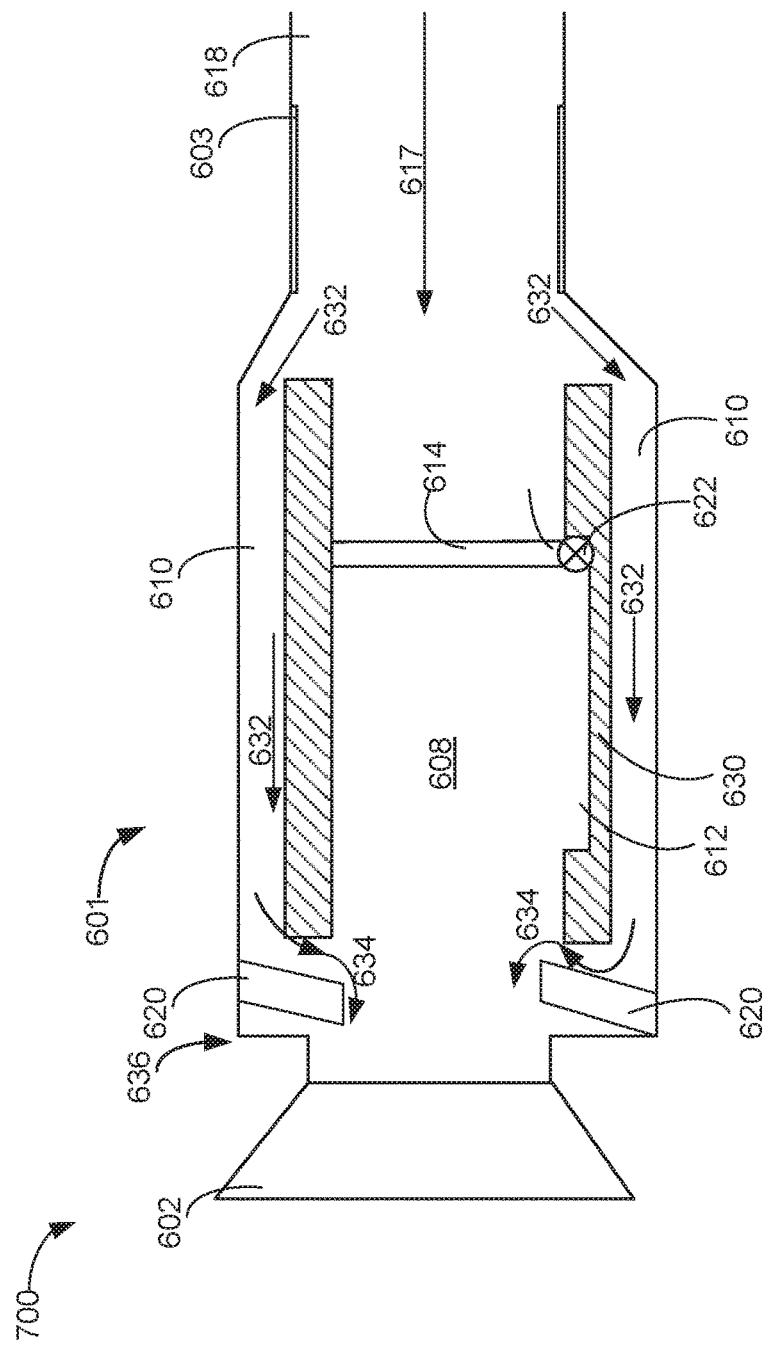
FIG. 9 is a schematic of air flow path through the swirl device in an activated closed position.

FIGS. 8 and 9 illustrate schematics of air flow paths through a swirl device 601 in a first deactivated position 600 and in a second activated position 700, respectively. The first deactivated position may be present when the air flow rate to a compressor is high (for example, above a threshold), while the second activated position may be seen when the air flow rate is low (for example, below the threshold). Intake air flows along an intake passage 618 to a compressor 602 (similar to the intake passage 418 fluidically connecting to the compressor housing 404, illustrated in FIGS. 6-8) through an inlet 603 of the swirl device along an air flow path 617. When the swirl device is in the first deactivated position 600, a recessable flap valve 614 attached with a hinge 622 to an inner flow passage 608 is stowed inside a recess 612 in a planar wall 630. Air flow 617 entering the inlet 603 of the swirl device continues to flow along a flow path 621 through the inner flow passage 608. The recessable flap valve is stowed away inside the recess 612 and does not act as a barrier to the air flow path 621. The air flows along the air flow path 621 and exits though an outlet 636 of the swirl device to enter the compressor 602. A small proportion of air flow 617 may also be directed to flow through the outer flow passage 610, along air flow path 623.

Figure 10:
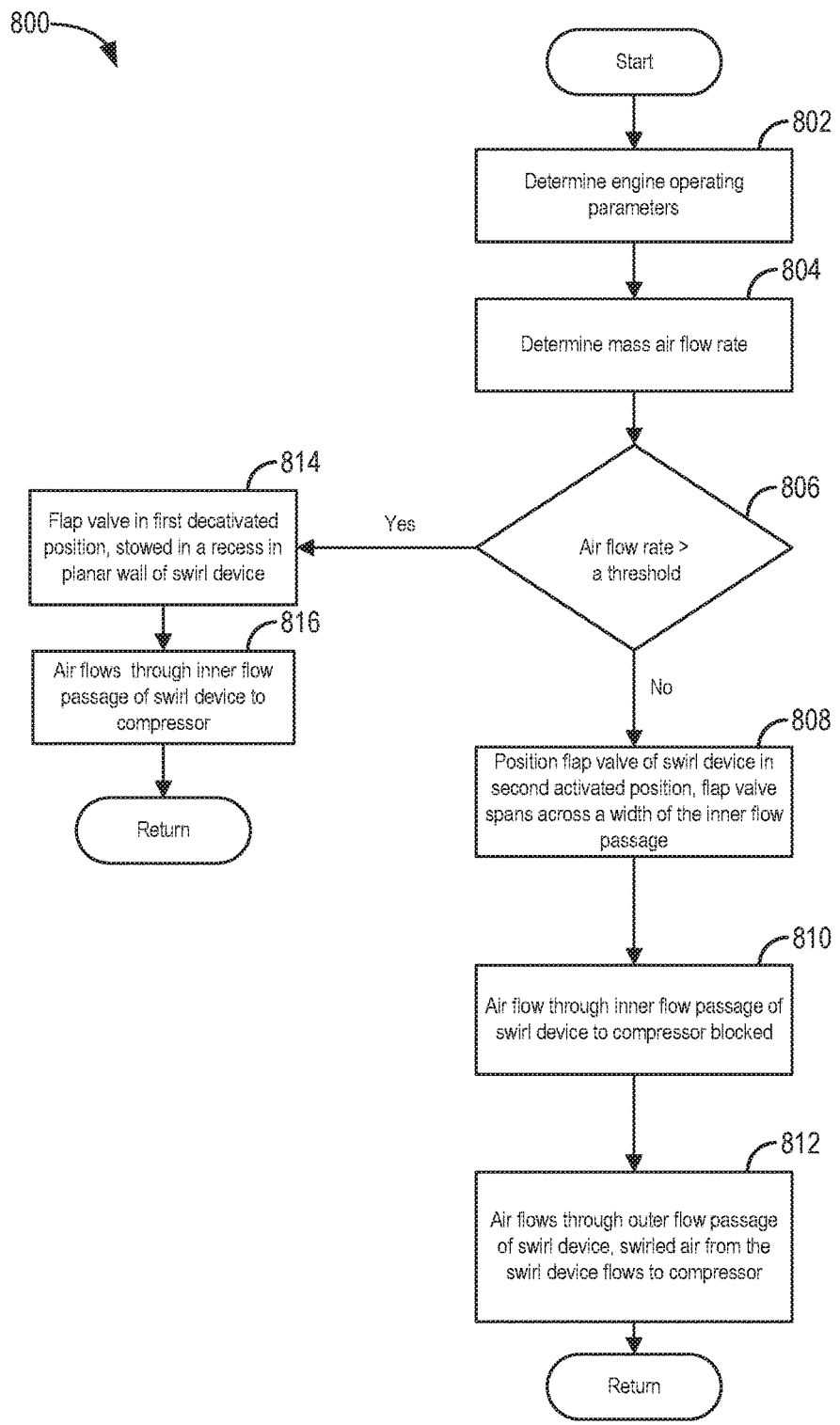
FIG. 10 illustrates a method of flowing intake air to the compressor through the swirl device of FIG. 3.

The swirl device 601 in the second activated position 700 is illustrated in FIG. 10, wherein the recessable flap valve 614 attached with the hinge 622 to the planar wall 630 is positioned to span across a width of the inner flow passage 608, obstructing the air flow path 617 from flowing through the inner flow passage 608 to the compressor 602. Obstruction in the air flow path 617 through the inner flow passage 608 results in the air flow 617 from the inlet 603 of the swirl device being directed along an air flow path 632 along the outer flow passage 610, as illustrated in FIG. 10. The air flowing through the outer flow passage 610 exits through one or more gaps between adjacent swirl vanes of a plurality of angled swirl vanes 620 along a swirled flow path 634 (also described above with reference to FIGS. 3-5). The angled swirl vanes generate a swirl in the air exiting the outer flow passage 610, such that exiting intake air may have multiple angled trajectories relative to a center axis of the outlet, as described above with reference to FIG. 4. The swirled air exiting the swirl device then flows through the outlet 636 into the compressor 602.

A method 800 for flowing air through a swirl device to a compressor inlet is illustrated in the flow chart in FIG. 10. Method 800 may be executed by a controller based on instructions stored on a memory of the controller and in conjunction with signals received from sensors of the engine system. The controller may employ engine actuators of the engine system to adjust engine operation, such as the control system 108 coupled to the sensors 110 and actuators 112, described above with reference to FIGS. 1 and 2.

The method 800 begins at 802 with determining engine operating parameters, including engine speed, engine load, torque demand, air mass flow, air pressure, etc. At 804, the method 800 determines mass air flow through the compressor. Mass air flow rate may be assessed based on engine operating parameters, including engine speed, throttle position, or through air flow meters, etc. As mass flow rate to the compressor increases, a ratio of air pressure and the mass air flow rate decreases, becoming lower than a peak efficiency island of a compressor map, resulting in flow friction, which may reduce compressor efficiency. In contrast, as the intake air flow rate to the compressor decreases, the ratio of the pressure and the mass air flow rate increases, becoming higher than the peak efficiency island of the compressor map, which may result in flow separation and noise generation, reducing compressor efficiency.

At 806, the method 800 determines if the mass air flow rate is greater than a specified threshold. If mass air flow rate is above the threshold (for example, when the engine is operating under mid-to-high load conditions), the method 800 proceeds to 814. At 814, the swirl device is moved to or maintained in a first deactivated position, wherein the recessable flap valve is stowed away in the recess in the planar wall of the inner flow passage of the swirl device (as shown in FIGS. 6 and 7), thereby not blocking air flow during high air flow rate conditions.

At 816, intake air flows through the inner flow passage of the swirl device to the compressor, without a swirl being generated in the air exiting the swirl device. The flow of air to the compressor at high flow rates through the inner flow passage and without swirl generation results in reduced flow friction, increasing compressor efficiency. The flow of intake air through the inner flow passage also enables maximum air flow to the compressor, which in turn aids in obtaining desired engine power. The method 800 then returns.

If at 806, the mass air flow rate is not greater than the threshold, (for example, when engine load is low), the swirl device is placed in or maintained in a second activated position at 808, wherein the recessable flap valve spans across a width of the inner flow passage (illustrated in FIG. 8), acting as a barrier to air flow through the inner flow passage. An actuator coupled to the flap valve may move the recessable flap valve to the second activated position. As a result, at 810, flow of air through the inner flow passage to the compressor is blocked. At 812, airflow is directed through the outer flow passage of the swirl device. Air flowing through the outer flow passage exits through the gaps between adjacent angled swirl vanes. The angled swirl vanes impart a swirl to the air exiting through the outer flow passage (as illustrated in FIG. 4) and the swirled air flows to the compressor. The swirl generated in the air exiting the outer flow passage provides a more favorable incident angle to the air entering the compressor, and minimizes flow separation, which results in minimization of noise during compressor operation. The method 800 then returns.

Thus, the swirl device regulates airflow to the compressor at different air flow rates to mitigate the noise generated during turbocharger operation. At high flow rates, air may flow through the inner flow passage of the swirl device to the compressor and then to the engine to generate desired engine torque, while at low flow rates, air flow through the inner flow passage is obstructed and air flows through the outer flow passage to the compressor. Swirled air exits the outer flow passage through a plurality of angled swirl vanes and flows to the compressor at a favorable incident angle, minimizing noise generated by the compressor at lower flow rates.

The technical effect of flowing intake air to a compressor through a swirl device is mitigation of noise associated with compressor operation at low air flow rates, while providing desired air charge to the engine for meeting engine torque demands, thereby enabling the compressor to function efficiently along a wide operating range, increasing overall efficiency of the turbocharger and the engine.

A system for a turbocharger, including a flow channel upstream of a compressor, forming an inner flow passage and an outer flow passage, an outlet portion of the inner flow passage fluidically connecting the inner flow passage to the compressor, a plurality of swirl vanes defining a downstream outlet of the outer flow passage, the downstream outlet fluidically connecting the outer flow passage to the compressor, and a recessable plate within the inner flow passage. In a first example of the system, wherein the downstream outlet of the outer flow passage is downstream of the recessable plate. A second example of the system optionally includes the first example and further includes, wherein the outer flow passage is at least partially concentric to the inner flow passage with the downstream outlet of the outer flow passage extending beyond the inner flow passage. A third example of the system optionally includes one or more of the first and second examples, and further includes wherein the outer flow passage fluidically connects to the compressor through a plurality of gaps each between adjacent swirl vanes of the plurality of swirl vanes at the downstream portion of the outer flow passage. A fourth example of the system optionally includes one or more of the first through the third examples, and further includes wherein the recessable plate is coupled to a planar wall of the inner flow passage and in a first position lays flush with the planar wall within a recess of the planar wall without protruding into the inner flow passage. A fifth example of the system optionally includes one or more of the first through the fourth examples, and further includes wherein the recessable plate in a second position is perpendicular to a longitudinal axis of the recess in the planar wall of the inner flow passage, blocking intake air flow through the inner flow passage to the compressor. A sixth example of the system optionally includes one or more of the first through the fifth examples, and further includes a hinge attaching the recessable plate to the planar wall of the inner flow passage. A seventh example of the system optionally includes one or more of the first through the sixth examples, and further includes wherein the recessable plate attached with the hinge to the inner flow passage is adjustable to a desired angular position relative to the recess. An eighth example of the system optionally includes one or more of the first through the seventh examples, and further includes a controller for adjusting the recessable plate position responsive to operating conditions of the system. A ninth example of the system optionally includes one or more of the first through the eighth examples, and further includes wherein the controller includes instructions to position the recessable plate to fluidically connect the inner flow passage to the compressor responsive to the operating condition including an intake air flow rate above a threshold. A tenth example of the system optionally includes one or more of the first through the ninth examples, and further includes wherein the controller includes instructions to position the recessable plate to block fluidic coupling of the inner flow passage to the compressor responsive to the operating condition including the intake air flow rate below the threshold. An eleventh example of the system optionally includes one or more of the first through the tenth examples, and further includes, wherein the controller includes instructions to position the recessable plate to block fluidic coupling of the inner flow passage to the compressor responsive to the operating condition including a ratio of compressor pressure and intake air flow rate above a threshold ratio, and wherein the controller includes instructions to position the recessable plate to fluidically connect the inner flow passage to the compressor responsive to the operating condition including the ratio of compressor pressure and intake air flow rate below the threshold ratio. A twelfth example of the system optionally includes one or more of the first through the eleventh examples, and further includes, wherein the outer flow passage is partitioned into a plurality of outer ducts, an inlet of each outer duct fluidically connected to an inlet of the flow channel, and an outlet of each outer duct fluidically connected to the compressor through at least one of the plurality of swirl vanes. A thirteenth example of the system optionally includes one or more of the first through the twelfth examples, and further includes, wherein the flow channel comprises an inner cylindrical passage that forms the inner flow passage and that is housed within an outer cylindrical passage, and the outer flow passage comprises an annular passage around the inner cylindrical passage.

An example method, comprising responsive to a first condition, actuating an actuator coupled to a hinged collapsible valve to position the hinged collapsible valve in a first position where the hinged collapsible valve lies flush with a planar wall inside a recess of the planar wall of a central passage, and flowing intake air through the central passage to a compressor inlet and responsive to a second condition, actuating the actuator coupled to the hinged collapsible valve to position the hinged collapsible valve in a second position where the hinged collapsible valve spans across a width of the central passage, blocking intake air flow through the central passage to the compressor inlet, and directing intake air flow through a concentric outer flow passage fluidically coupled to the central passage, the intake air exiting the outer flow passage through a plurality of angled swirl vanes and flowing to the compressor inlet. A first example of the method wherein the first condition comprises an intake air flow rate above a threshold, and wherein the second condition comprises the intake air flow rate below the threshold. A second example of the method optionally includes the first example and further includes, responsive to a third condition, positioning the hinged collapsible valve in the first position, and flowing intake air through the central passage to a compressor inlet, wherein the third condition comprises a ratio of compressor pressure and intake air flow rate below a threshold ratio and responsive to a fourth condition, positioning the hinged collapsible valve in the second position, and flowing intake air through the concentric outer flow passage to the compressor inlet, wherein the fourth condition comprises the ratio of compressor pressure and intake air flow rate above the threshold ratio.

Another example system, comprising an engine, a turbocharger with a compressor coupled to the engine, the compressor including a housing; a flow duct upstream of an impeller of the compressor, forming an inner flow passage and an outer flow passage surrounding the inner flow passage, a plurality of angled swirl vanes defining a most downstream portion of the outer flow passage, upstream of the impeller of the compressor, a recessable plate attached by a hinge to the inner flow passage, and a controller storing instructions for regulating a position of the recessable plate. A first example of the system includes wherein the flow duct is positioned within the compressor housing. A second example of the system optionally includes the first example and further includes, wherein the recessable plate is coupled to an actuator controlled by the controller and wherein activation of the actuator by the controller moves the recessable plate from a first position where the recessable plate is lying flush inside a recess in a planar wall of the inner flow passage, to a second position where the recessable plate spans across a width of the inner flow passage, perpendicular to the recess on the planar wall of the inner flow passage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger system, comprising:
    a flow channel upstream of a compressor, forming an inner flow passage and an outer flow passage, an outlet portion of the inner flow passage fluidically connecting the inner flow passage to the compressor;
    a plurality of swirl vanes defining a downstream outlet of the outer flow passage, the downstream outlet fluidically connecting the outer flow passage to the compressor; and
    a recessable plate positioned within the inner flow passage;
    wherein the recessable plate is coupled to a flat planar wall of the inner flow passage via a hinge and operable between a first position and a second position.

2. The system of claim 1, wherein the downstream outlet of the outer flow passage is downstream of the recessable plate.

3. The system of claim 1, wherein the outer flow passage is at least partially concentric to the inner flow passage with the downstream outlet of the outer flow passage extending beyond the inner flow passage.

4. The system of claim 1, wherein the outer flow passage fluidically connects to the compressor through a plurality of gaps each between adjacent swirl vanes of the plurality of swirl vanes at a downstream portion of the outer flow passage.

5. The system of claim 1, wherein, in the first position, the recessable plate lays flush with the planar wall within a recess of the planar wall without protruding into the inner flow passage, the inner flow passage further having an upstream and downstream transition between the flat planar wall and circular walls.

6. The system of claim 5, wherein the recessable plate in the second position is perpendicular to a longitudinal axis of the recess in the planar wall of the inner flow passage, blocking intake air flow through the inner flow passage to the compressor.

7. The system of claim 1, wherein the recessable plate attached with the hinge to the inner flow passage is adjustable to a desired angular position relative to the recess.

8. The system of claim 1, further comprising at least one sensor and a controller including instructions stored in a non-transitory computer-readable medium for controlling an actuator of the recessable plate to adjust a recessable plate position between the first position and the second position responsive to operating conditions of the system.

9. The system of claim 8, wherein the controller includes instructions stored in the non-transitory computer-readable medium to determine an intake air flow rate via the at least one sensor, compare the intake air flow rate to a threshold, and control the actuator of the recessable plate to position the recessable plate to fluidically connect the inner flow passage to the compressor responsive to the operating condition including an intake air flow rate being above the threshold.

10. The system of claim 9, wherein the controller includes instructions stored in the non-transitory computer-readable medium to control the actuator of the recessable plate to position the recessable plate to block fluidic coupling of the inner flow passage to the compressor responsive to the operating condition including the intake air flow rate being below the threshold.

11. The system of claim 9,
    wherein the controller includes instructions stored in the non-transitory computer-readable medium to determine a ratio of compressor pressure and intake air flow rate via the at least one sensor, compare the ratio to a threshold ratio, and
    responsive to the ratio being above the threshold ratio, control the actuator of the recessable plate to position the recessable plate to block fluidic coupling of the inner flow passage; and
    responsive to the ratio being below the threshold ratio, control the actuator of the recessable plate to position the recessable plate to fluidically connect the inner flow passage to the compressor.

12. The system of claim 1, wherein the outer flow passage is partitioned into a plurality of outer ducts, an inlet of each outer duct fluidically connected to an inlet of the flow channel, and an outlet of each outer duct fluidically connected to the compressor through at least one of the plurality of swirl vanes.

13. The system of claim 1, wherein the flow channel comprises an inner cylindrical passage that forms the inner flow passage and that is housed within an outer cylindrical passage, and the outer flow passage comprises an annular passage around the inner cylindrical passage.

14. A method, comprising:
 determining an operating condition of an engine;
 responsive to a first operating condition of the engine, actuating an actuator coupled to a hinged collapsible valve to position the hinged collapsible valve in a first position where the hinged collapsible valve lies flush with a planar wall inside a recess of the planar wall of a central passage, and flowing intake air through the central passage to a compressor inlet; and
 responsive to a second operating condition of the engine, actuating the actuator coupled to the hinged collapsible valve to position the hinged collapsible valve in a second position where the hinged collapsible valve spans across a width of the central passage, blocking intake air flow through the central passage to the compressor inlet, and directing intake air flow through a concentric outer flow passage fluidically coupled to the central passage, the intake air exiting the outer flow passage through a plurality of angled swirl vanes and flowing to the compressor inlet.

15. The method of claim 14, further comprising determining an intake air flow rate via/by at least one sensor and comparing the intake air flow rate to a threshold,
 wherein the first operating condition of the engine comprises the intake air flow rate above the threshold; and
 wherein the second operating condition of the engine comprises the intake air flow rate below the threshold.

16. The method of claim 14, further comprising:
 determining an intake air flow rate and a compressor pressure via the at least one sensor;
 comparing a ratio of the compressor pressure and the intake air flow rate to a threshold ratio,
  wherein responsive to a third operating condition of the engine comprises the ratio being below the threshold ratio; and
  wherein a fourth operating condition of the engine comprises the ratio being above the threshold ratio;
 responsive to the third operating condition of the engine, actuating the actuator coupled to the hinged collapsible valve to position the hinged collapsible valve in the first position, and flowing intake air through the central passage to the compressor inlet; and
 responsive to the fourth operating condition of the engine, actuating the actuator coupled to the hinged collapsible valve to position the hinged collapsible valve in the second position, and flowing intake air through the concentric outer flow passage to the compressor inlet.

17. A system, comprising:
 an engine;
 a turbocharger with a compressor coupled to the engine, the compressor including a housing;
 a flow duct upstream of an impeller of the compressor, forming an inner flow passage and an outer flow passage surrounding the inner flow passage;
 a plurality of angled swirl vanes defining a most downstream portion of the outer flow passage, upstream of the impeller of the compressor;
 a recessable plate attached by a hinge to the inner flow passage,
  wherein the recessable plate is coupled to a flat planar wall of the inner flow passage; and
 a controller including a non-transitory computer-readable medium storing instructions for regulating a position of the recessable plate.

18. The system of claim 17, wherein the flow duct is positioned within the compressor housing.

19. The system of claim 18, wherein the recessable plate is coupled to an actuator controlled by the controller and wherein activation of the actuator by the controller moves the recessable plate from a first position where the recessable plate is lying flush inside a recess in the planar wall of the inner flow passage, to a second position where the recessable plate spans across a width of the inner flow passage, perpendicular to the recess in the planar wall of the inner flow passage.

* * * * *